Oct. 21, 1969   A. GOEB ET AL   3,474,018
METHOD OF MANUFACTURING 1,1,1-TRICHLOROETHANE
Filed July 21, 1967   2 Sheets-Sheet 1

INVENTORS
ANDRÉ GOEB
JACQUES VUILLEMENOT
BY
ATTORNEYS

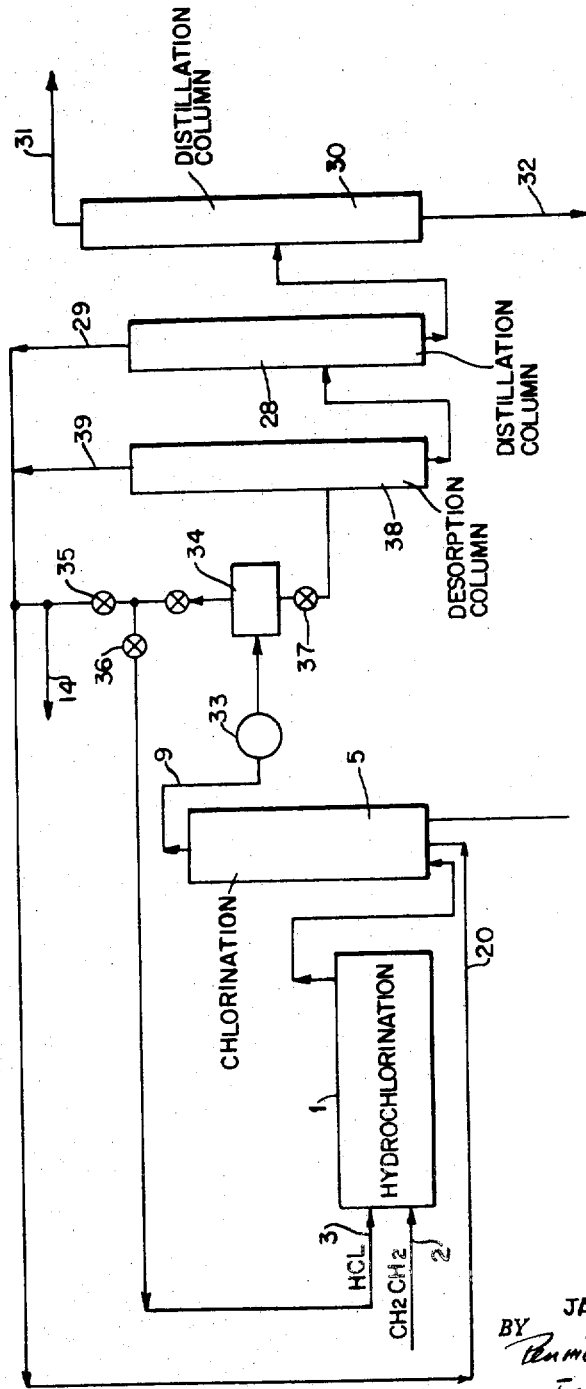

United States Patent Office 3,474,018
Patented Oct. 21, 1969

3,474,018
METHOD OF MANUFACTURING 1,1,1-TRICHLOROETHANE
Andre Goeb and Jacques Vuillemenot, Uriage, Isere, France, assignors to Ugine Kuhlmann, Paris, France, a French company
Filed July 21, 1967, Ser. No. 658,305
Int. Cl. B01j *1/10;* C07c *17/00, 26/00*
U.S. Cl. 204—163                                16 Claims

ABSTRACT OF THE DISCLOSURE

In the preparation of 1,1,1-trichloroethane, ethylene is first reacted with hydrogen chloride in the presence of a catalyst. The ethyl chloride product, together with 1 to 6 moles of chlorine per mole of ethyl chloride and a gaseous diluent such as hydrogen chloride, is fed continuously to a tubular reactor having a centrally located fluorescent tube under whose excitation the gaseous mixture reacts photochemically to synthesize 1,1,1-trichloroethane with the simultaneous generation of hydrogen chloride and a minor amount of chlorinated by-products. The average residence time of the gaseous mixture in the reactor is about 1 to 30 seconds and the reaction temperature is maintained between 25° C. and 200° C.

BACKGROUND OF THE INVENTION

Field of the Invention

This invention relates to the production of 1,1,1-trichloroethane which is also known as methyl chloroform. More particularly, it relates to the photochemical synthesis of 1,1,1-trichloroethane in the gaseous phase.

Description of the Prior Art

Various methods have been used in the industry for the manufacture of 1,1,1-trichloroethane which is an excellent solvent for metal degreasing. The better known methods are based on (1) hydrochlorination of vinylidene chloride, (2) thermal chlorination of 1,1-dichloroethane or of a mixture of 1,1-dichloroethane and ethyl chloride, (3) catalytic chlorination of ethylene, and (4) photochemical chlorination of 1,1-dichloroethane in liquid or gaseous phase. While most of the prior processes provide satisfactory yield, they generally suffer from many disadvantages.

Thus the hydrochlorination of vinylidene chloride requires the use of a Friedel-Crafts catalyst, i.e., anhydrous ferric chloride, which must then be carefully removed if all dehydrochlorination is to be avoided upon distillation of the mixture resulting from the reaction for the recovery of the product. This removal constitutes the principal defect of the process which, however, further suffers from the fact that it employs an expensive starting material.

The thermal chlorination of 1,1-dichloroethane or of mixtures thereof with ethyl chlorides, as described for example, in U.S. Patent No. 3,012,081, has good yields of 1,1,1-trichloroethane but it requires operating in a temperature range where dehydrochlorination reactions occur wtih formation of vinyl chloride and of vinylidene chloride by-products. Moreover, under these conditions an incipient decomposition is observed which is manifested by the appearance of carbonaceous deposit.

In the manufacture of 1,1,1-trichloroethane by catalytic chlorination of ethylene and/or of 1,2-dichloroethane with chlorine to produce 1,1,2-trichloroethane the thus obtained product is impure and requires purification by distillation. The purified product is then subjected to a dehydrochlorination treatment to produce vinylidene chloride. Thereafter hydrochloric acid is used to react with vinylidene chloride, the hydrochloric acid being optionally obtained as a by-product of the chlorinating step. This process, while it gives good transformation yields from the 1,1,2-trichloroethane, it must be emphasized that the principal product in the chlorination of ethylene step is the 1,2-dichloroethane and not 1,1,2-trichloroethane. The consequence is that the production of 1,1,1-trichloroethane is tied to the production of 1,2-dichloroethane, the by-product, in an even larger amount since the two are substantially unavoidably connected together which constitutes a serious disadvantage. Moreover, the dehydrochlorination reaction, which is accompanied by the use of a base such as sodium hydroxide or lime, entails the production of a mineral chloride with the consequential loss of the base and of a hydrochloric acid molecule removed from the 1,1,2-trichloroethane.

The manufacture of 1,1,1-trichloroethane by photochemical chlorination of 1,1-dichloroethane in liquid phase requires the use of a solvent. Among the solvents suitable for the reaction, carbon-sulfide appears to be the most effective. Its use however complicates the manufacturing process because of the required additional separating and purifying steps. This solvent also has the main disadvantage of being readily flammable which contributes to a certain degree, to reducing the already low stability of 1,1,1-trichloroethane.

It has also been noted that it is possible by photochemical chlorination of a weakly chlorinated compound, 1,1-dichloroethane, in a gaseous phase, to derive 1,1,1-trichloroethane therefrom. Thus, there has been proposed a plural stage process using a gaseous diluent for the production of 1,1,1-trichloroethane from 1,1-dichloroethane. This process employs as a starting material, a material which has already undergone processing and which is consequently an expensive one.

SUMMARY OF THE INVENTION

The present invention pertains to a process of manufacturing 1,1,1-trichloroethanes from ethylene and chlorine by an initial catalytic hydrochlorination of ethylene with hydrogen chlorides from a subsequent reaction step to form ethyl chloride and thereafter photochemically chlorinating the ethyl chloride in a gaseous phase at a temperature between 25° C. and 200° C. and in the presence of a gaseous diluent, the amount of the latter being sufficient to maintain the reaction in the gaseous phase. Broadly stated, the process comprises reacting ethylene with hydrogen chloride in the presence of a suitable catalyst to produce ethyl chloride which is then fed to a reaction zone together with 1 to 6 moles of chlorine gas and a gaseous diluent. While in the reaction zone, the gaseous mixture is irradiated with an actinic radiation for a period between 1 and 30 seconds at a temperature in the range from about 25° C. to about 200° C. to synthesize 1,1,1-trichloroethane with the simultaneous generation of hydrogen chloride. The gaseous product from the reaction zone is removed and is treated to separate therefrom the hydrogen chloride which is recycled for the production of ethyl chloride and to recover 1,1,1-trichloroethane therein.

The gaseous diluent required for the process may be an inert gas such as nitrogen, gaseous carbonic acid and noble gases. Advantageously, the diluent for the process of this invention is hydrogen chloride, the use of which eliminates the requirement for separating the diluent from the hydrogen chloride generated in the photochemical reaction prior to the recycling of the latter for the production of ethyl chloride.

BRIEF DESCRIPTION OF THE DRAWINGS

FIGS. 1 to 3 are schematic flow sheets of various embodiments in accordance with the process of the present invention.

DESCRIPTION OF THE PREFERRED EMBODIMENT

Figure 1:
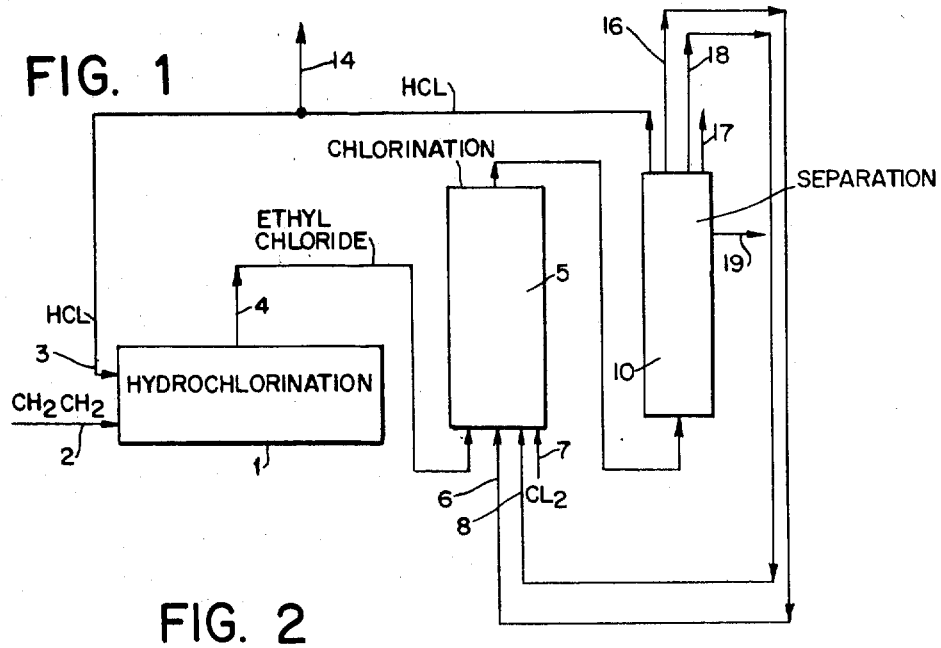

Referring initially to FIG. 1, ethylene and hydrogen chloride are reacted in a suitable reactor 1 in the presence of a suitable catalyst to produce ethyl chloride in accordance with any known techniques. Preferably, the hydrochlorination is carried out by feeding about equal molar amounts of ethylene and hydrogen chloride by conduits 2 and 3, respectively to the reactor 1 which contains liquid ethyl chloride and a Friedel-Crafts type catalyst dissolved in the organic phase under pressure and at a moderate temperature. The hydrogen chloride used for the hydrochlorination is recovered from chlorination as will be described hereinafter.

The ethyl chloride thus produced may be purified by distillation (not shown in FIG. 1) before being used in the subsequent reaction. The purified ethyl chloride in gaseous or vapor phase is then fed by a suitable conduit 4 to a second reactor 5 for the photochemical synthesis of 1,1,1-trichloroethane by chlorination with gaseous chlorine which is fed into the reactor 5 by a pipe 7. Simultaneously a gaseous diluent is fed into the reactor 5 by pipe 6 which as indicated in FIG. 1 is connected to the separation apparatus 10 used for recovering and separating various gas components from the product stream 9 of the reactor 5. The excess chlorine and optionally the chlorinated by-products which have lower boiling points than 1,1,1-trichloroethane recovered from the separation apparatus 10 are also fed to the reactor 5 by pipe 8.

The reactor 5 for the chlorination of ethyl chloride, preferably, is designed for continuous operation having therein sources of actinic radiation which are used to initiate the photochemical synthesis of 1,1,1-trichloroethane and heat transfer means for removing excess heat generated therein and for maintaining the reaction at a suitable temperature. The actinic ray suitable for the photochemical reaction has wave lengths in the range between 2500 and 4000 A. The usual sources of light for commercial application of the present process are fluorescent tubes, which can be used advantageously in a vertical tubular reactor by placing centrally therein. Each reactor in such an arrangement is in the form of two concentric vertical tubes having an annular space which is used as the reaction zone. Heat exchanger is positioned at the outside of the tubular reactor for the removal of excess heat generated during chlorination. This arrangement is a very effective way of illuminating or irradiating the gaseous mixture for the photochemical reaction.

The gaseous diluents as mentioned hereinabove may be an inert gas or hydrogen chloride which is used to remove in combination with the heat exchanger, the excess heat generated in the chlorination of ethyl chloride and, at the same time, prevents the formation of a condensed phase in the reactor 5. The chlorine itself may be considered, to a certain extent, as a diluent but it cannot be used alone for this purpose because the nature of the composition of the products of chlorination depend on the composition of the starting mixture. We have observed that the selectivity of the photochemical reaction which can be defined as the molar ratio of methylchloroform to 1,1,2 - trichloroethane is dependent on the presence of the constituents of thereaction in gaseous form. It is noted that immediately upon the formation of any substantial condensed phase in the irradiated zone, the selectivity falls sharply, other things being equal. For example, in a test in which a condensed phase was formed amounting to 5% by weight of the gaseous phase, the selectivity in the condensed phase was no more than 0.18 whereas in the gaseous phase, it reached the value of 3.1. The process, therefore, requires the use of a diluent to prevent the formation of a condensed phase in the portion of the reactor which undergoes irradiation from the actinic ray. Subject to this qualification, the selectivity of the photochemical reaction does not in any substantial degree depend on the dilution of the reactants. For optimum capacity of the reactor it is preferred to employ the least amount of dilution which will prevent the formation of a condensed phase. The following Table I shows that the dilution can be varied over wide limits.

TABLE I

| Dilution: molar ratio of nitrogen (the diluent gas) to ethyl chloride | Molar ratio of $Cl_2$ to ethyl chlorides | Temperature in ° C. | Residence time in seconds | Selectivity |
| --- | --- | --- | --- | --- |
| 5.95 | 2.65 | 50 | 7.8 | 3.2 |
| 2.74 | 2.65 | 50 | 7.8 | 3.0 |
| 0.99 | 2.66 | 50 | 7.8 | 3.1 |

An increase in the temperature makes it possible to reduce the quantity of gaseous diluent necessary to maintain the reactants and the products of the chlorination in a gaseous condition. There is thus available a ready means for increasing the productivity of 1,1,1 - trichloroethane.

We observed that the selectivity of the photochemical chlorination reaction of the ethyl chloride in the gaseous phase varies only slightly over a wide range of temperatures and that it is advantageous to work between ambient temperature and 200° C., preferably between 30 and 100° C.

Although the photochemical chlorination of ethyl chloride carried out in the gaseous phase according to the invention favors the formation of asymmetric chlorinated derivatives and in particular of 1,1 - dichloroethane and 1,1,1 - trichloroethane, complex mixture such as 1,2 - dichloroethane, 1,1,2 - trichloroethane, the tetrachloroethanes, pentachloroethane, and hexachloroethane in addition to the asymmetric derivatives are also produced. We have discovered that for a given temperature and residence time in the reactor 5, the nature and composition of the resulting product depends closely on the molar ratio of chlorine to ethyl chloride.

When the molar rate of chlorine and ethyl chloride is close to unity, almost no hexachloroethane or pentachloroethane are produced and only very small quantities of tetrachloroethane. On the other hand, certain amounts of non-transformed ethyl chloride and measurable quantities of 1,1-dichloroethane are found in the product stream.

When the molar ratio of chlorine to ethyl chloride is three or more, the ethyl chloride is substantially all transformed. There is substantially no 1,1-dichloroethane but substantial quantities of derivatives less volatile than methylchloroform are obtained. Table II shows the influence of the molar ratio of chlorine to ethyl chloride. In view of the improved selectivity which is compatible with a high yield of 1,1,1-trichloroethane, the molar ratio of chlorine to ethyl chloride should be between 1 and 6 and preferably between 2 and 4.

with a current of recycled gases arriving at 20. This current of recycled gases comprises the diluent, non-trans-

TABLE II

| Molar ratio of chlorine to ethyl chloride | Temperature in ° C. | Residence time in seconds | Dilution: molar ratio of HCl* to ethyl chloride | Selectivity | Composition of the product mixture withdrawn from the reaction** (percent by weight) | | | | | | | Productivity of 1,1,1-trichloroethane (g./h./l.) |
|---|---|---|---|---|---|---|---|---|---|---|---|---|
| | | | | | | Chloroethane | | | | | | |
| | | | | | 1,1-di- | 1,1,1-tri- | 1,2-di- | 1,1,2-tri- | Tetra- | Penta- | Hexa- | |
| 2.2 | 50 | 7.8 | 2 | 4.5 | 10.0 | 66 | 8.2 | 14.8 | 1.0 | 0 | 0 | 245 |
| 2.4 | 50 | 7.8 | 2 | 3.6 | 3.5 | 64 | 7.5 | 17.8 | 5.5 | 1.7 | 0 | 280 |
| 2.8 | 50 | 7.8 | 2 | 3.0 | 2.7 | 61 | 6.4 | 20.4 | 7.1 | 2.4 | Trace | 250 |
| 3.3 | 50 | 7.8 | 2 | 2.5 | 1.4 | 54 | 3.6 | 21.6 | 13.4 | 4.4 | 1.6 | 200 |

* The gaseous diluent.
** Ethyl chloride quantitatively transformed.

The influence of the residence time of the gaseous mixture in the portion of the reactor subject to radiation is greater on the degree of chlorination achieved than it is on the selectivity of the reaction. Increase in the residence time results in an increase in the production of the derivatives less volatile than 1,1,1-trichloroethane and to an increase in the fraction of ethyl chloride transformed. Table III indicates the influence of this residence time. We prefer to use residence time between 1 and 30 seconds and preferably between 3 and 15 seconds.

formed materials, and optionally any by-products which are more volatile than 1,1,1-trichloroethane.

The vapors emerging from the reactor 5 at 9 are sent first to a washing column 21 operating at low temperature and in which the washing fluid used in an organic compound of low volatility such as hexachlorobutadiene. The chlorinated hydrocarbons formed in the reactor 5 are condensed in the washing column 21. The chlorine which has not undergone reaction is dissolved at 21 in the chilled organic phase. Substantially all the hydrogen chlo-

TABLE III

| Residence time in seconds | Temperature in ° C. | Molar ratio of chlorine to ethyl chloride | Dilution: molar ratio of HCl* to ethyl chloride | Selectivity | Ethyl chloride | Composition of the product mixture removed from the reaction (Percent by weight) | | | | | | |
|---|---|---|---|---|---|---|---|---|---|---|---|---|
| | | | | | | Chloroethane | | | | | | |
| | | | | | | 1,1-di- | 1,1,1-tri- | 1,2-di- | 1,1,2-tri- | Tetra- | Penta- | Hexa- |
| 3.9 | 50 | 2.84 | 6.1 | 2.7 | 2.8 | 5.0 | 58 | 8.6 | 21.4 | 4.2 | 0 | 0 |
| 7.8 | 50 | 2.84 | 6.1 | 3.1 | 0 | 3.5 | 62 | 6.3 | 20 | 6.5 | 1.7 | Traces |
| 11.0 | 50 | 2.85 | 6.1 | 3.5 | 0 | 0.5 | 66.5 | 4.0 | 19 | 7.5 | 2.2 | 0.3 |

* The gaseous diluent.

The pressure in reactor 5 may be atmospheric or at a higher pressure. This pressure, which is generally less than 10 kg./cm.$^2$ (gauge) may be the same as that which is used in the reactor 1 for hydrochlorination of the ethylene. It may however be different, for example lower, if there is employed a technique for hydrochlorination which involves the use of a relatively high pressure above about 10 kg./cm.$^2$ (gauge).

After being withdrawn from this reactor the gaseous mixture is treated in the separation apparatus 10 to separate the diluent, the starting materials which have not undergone reaction, and by-products which are more volatile and also those which are less volatile than 1,1,1-trichloroethane. The apparatus 10 may be any combination of well known equipment.

As shown in FIG. 1, the hydrogen chloride separated from the product gaseous mixture is recycled by a suitable conduit 13 to the reactor 1 for hydrochlorination of additional ethylene. Excess hydrogen chloride, not required for the hydrochlorination, is bled off or otherwise removed from the circuit using outlet 14. Similarly the gaseous diluent and the excess hydrogen chloride and optionally the chlorinated by-products with lower boiling points than 1,1,1-trichloroethane, after being removed from the separation apparatus 10, are recycled by suitable conduits 16 and 18, respectively, to the second reactor 5 for use to make up the feed for the photochemical synthesis. The product, 1,1,1-trichloroethane, is recovered from the separation apparatus 10 by way of outlet 17 and the chlorinated by-products which have higher boiling points than the product is removed from apparatus 10 through outlet 19.

Figure 2:
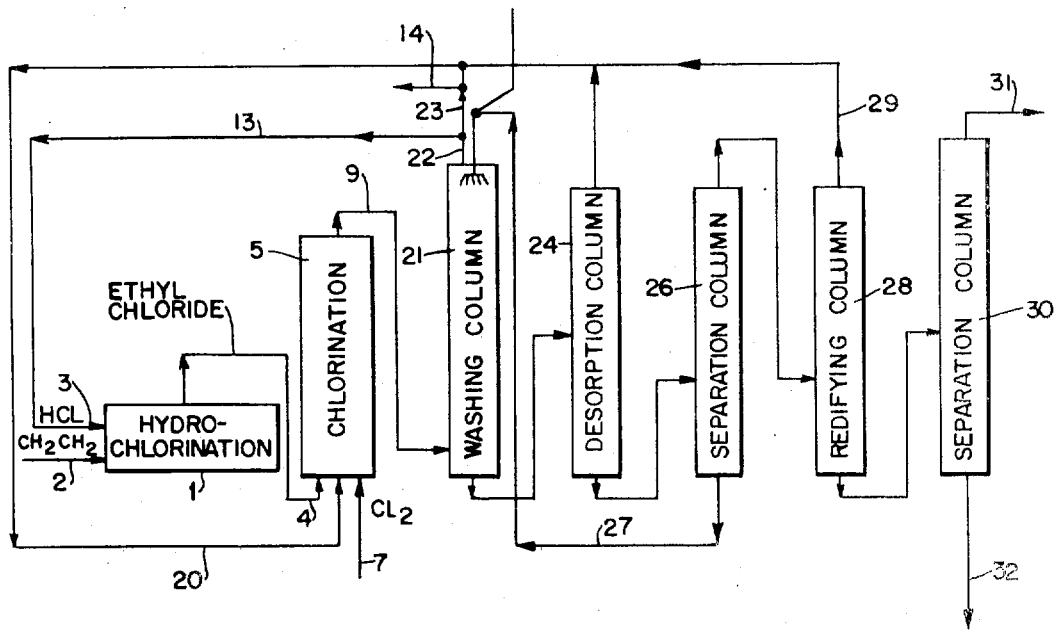

Referring now to FIG. 2, which illustrates in greater detail a method for separating various gas components in the product mixture and uses the same numerals to designate similar equipment shown in FIG. 1. In FIG. 2, the hydrochlorination reactor 1 receives the ethylene and hydrogen chloride at 2 and 3 respectively, the latter being derived from the chlorination reactor 5. The chlorination reactor 5 is fed at the lower end with a current of gaseous chlorine arriving at 7, with a current of ethyl chloride in gaseous form coming from 1 via line 4, and ride in the product stream remains in a gaseous phase and escapes from the top of the column at 22. The quantity of HCl necessary for hydrochlorination of ethylene is sent via line 13 to the reactor 1. The quantity thereof necessary as a diluent gas is taken at a line 23 and sent to the reactor 5, and the excess is withdrawn at 14.

The organic liquid phase collected at the bottom of the column 21 is sent to a desorption column 24 from the top of which the chlorine escapes at 25. The residual HCl and any non-transformed ethyl chloride which also escapes at 25 are recycled with the chlorine to the reactor 5 via line 20.

The liquid phase collected at the lower end of the column 24 which is predominately chlorinated product in solvent is sent to a separation column 26, at the lower end of which the washing solvent is collected and thence returned via line 27 to the top of the column 21. The products of the chlorination withdrawn at the top of the column 26 are sent to a rectifying column 28. At the top of this column there are separated the by-products which are more volatile than 1,1,1-trichloroethane (and in particular the 1,1-dichloroethane), these products being recycled via lines 29 and 20 to the reactor 5. The liquid products collected at the lower end of the column 28 are sent into a second separation column 30 from the top of which the purified 1,1,1-trichloroethane is withdrawn at 31. At the bottom of this column 30 the by-products less volatile than methylchloroform are withdrawn at 32.

FIG. 3 illustrates a second method for separating various product components wherein hydrochlorination reactor 1 fed with ethylene at 2 and with HCl at 3 from the separator are shown as in the previously described embodiments. The photochemical reactor 5 is fed with ethyl chloride at 4, with chlorine at 7, and at 20 with a mixture containing the diluent, the non-reacted materials and optionally with any by-products more volatile than 1,1,1-trichloroethane. This mixture being fed in at 20.

The vapors withdrawn at 9 from the reactor 5 are compressed to a pressure of several atmospheres using a compressor 33 and are then chilled at this pressure to a very low temperature in a condenser 34. The non-condensed gases comprise essentially HCl. These are passed through an expansion valve 35 down to the operating pressure of the reactor 5 and then through another expansion valve 36 to the operating pressure of the reactor 1. Any excess HCl can be withdrawn at 14.

The organic liquid phase formed in the course of the cooling at high pressure at 34 is reduced in pressure by means of an expansion valve 37 and is sent after expansion into a desorption column 38. At the upper end of this column there escapes via 39 a mixture of chlorine, HCl and any of the gaseous ethyl chloride. This mixture is recycled via line 20 to the reactor 5.

The liquid withdrawn at the lower end of the column 38 is then introduced into a first distillation column 28. At the upper end of this column the constituents more volatile than 1,1,1-trichloroethane (and in particular the 1,1-dichloroethane) are withdrawn at 29 and recycled via line 20 to the reactor 5.

At the bottom of the column 28 there is withdrawn a liquid phase which is then sent into a second distillation column 30. At the upper end of this column the 1,1,1-trichloroethane is separated off at 31 whereas the by-products less volatile than 1,1,1-trichloroethane are withdrawn from the bottom of the column at 32.

The process of the invention possesses numerous advantages. In particular, it constitutes the most direct and most economical method of transforming from the hydrocarbon (i.e. from ethylene) to 1,1,1-trichloroethane. Other prior methods of which we are aware utilize starting materials which themselves are the result of complex chemical processes, such as vinylidene chloride and 1,1-dichloroethane obtained from ethylene, ethane or acetylene. Instead, the method of the invention starts from the hydrocarbon itself, passing first to ethyl chloride in a single reaction and then to 1,1,1-trichloroethane by chlorination of the ethyl chloride without requiring a difficult and delicate separation of the ethyl chloride. The invention moreover makes it possible to achieve a very high selectivity of the trichlorinated derivatives since the molar ratio of 1,1,1-trichloroethane to 1,1,2-trichloroethane may achieve values greater than three. The invention also makes it possible to employ the major part of the hydrogen chloride prepared in the course of the chlorination step for the production of the ethyl chloride from ethylene. Lastly, the invention leaves as by-products only a relatively small quantity of derivatives which are less volatile than 1,1,1-trichloroethane such as 1,2-dichloroethane, 1,1,2-trichloroethane, tetrachloroethane, pentachloroethane and hexachloroethane.

Example

The following non-limitative example illustrates the mode of operation according to the invention indicated in FIG. 2.

Substantially equal molar quantities of dry ethylene and of gaseous HCl were introduced into the reactor 1 containing ethyl chloride. In particular, ethylene was introduced via line 2 at a rate of 1.4 kg. per hour and HCl was introduced via line 3 at a rate of 1.7 kg. per hour. The temperature of the reactor was held at 40° C. and the pressure was held in the vicinity of 2.5 kg. per square centimeter. The reactor of hydrochlorination was catalyzed by the addition of aluminum chloride at a rate of 0.01 kg. per hour. Ethyl chloride of approximately 96% purity was recovered at the rate of 3 kg. per hour. The installation included means to produce the desired pressure in the reactor 1 and to send to the outlet of reactor 5 the gases under pressure. The chlorination reactor 5 was fed at line 7 with gaseous chlorine at the rate of 5.8 kg. per hour and at line 4 with gaseous ethyl chloride coming from the reactor 1 at the rate of 3 kg. per hour. It was fed at line 20, and at a rate of 14.6 kg. per hour with a gaseous mixture comprising by weight 75% HCl, 21.6% chlorine and 3.4% 1,1-dichloroethane.

The reactor 5 was held at 50° C. and under a pressure slightly above atmospheric. The gaseous mixture emerging at the top of the reactor 5 was sent to the bottom of the washing column 21. The column was cooled to −20° C., and sprayed at the top thereof with hexachlorobutadiene at the rate of 7.5 kg. per hour. Pure HCl escaped at 22 from the top of the column 21 at the rate of 13.8 kg. per hour. Of this hydrogen chloride, 1.7 kg. per hour were sent via line 13 to the reactor 1, 10.5 kg. per hour being sent via line 20 to the inlet to the reactor 5 and rest being withdrawn at 14. The organic liquid phase collected at the bottom of the washing column 21 was sent to the desorption column 24 operating at 55° C. At line 25, at the top of column 24, there was recovered a gaseous mixture amounting to 3.6 kg. per hour and made up 13% by weight of hydrogen chloride and approximately 87% by weight of chlorine, with traces of 1,1-dichloroethane. The mixture was recycled via line 20 to the reactor 5. At the bottom of this column there was withdrawn a liquid phase at the rate of 13.7 kg. per hour, which was fed to the distillation column 26. At the bottom of this column 26 hexachlorobutadiene was withdrawn in substantially pure form at the rate of 7.4 kg. per hour, this being sent via line 27 to the top of the column 21. In addition, there was withdrawn from the top of the column 21 1,1,1-trichloroethane polluted with various by-products of the reaction. This mixture was sent to the column 28. From the top of column 28 there was withdrawn at line 29 0.5 kg. per hour of 1,1-dichloroethane which was returned via line 20 to the reactor 5. A liquid phase was withdrawn from the bottom of the column 29 and this was sent to distillation column 30. At the top of the column 30 there was withdrawn, at line 31, 3.5 kg. per hour of pure 1,1,1-trichloroethane and, at line 32, 21.1 kg. per hour of a mixture made up of 17.4% by weight of 1,2-dichloroethane, 54.8% by weight of 1,1,2-trichloroethane, 20.5% by weight of tetrachloroethane and 7.3% by weight of pentachloroethane.

We claim:

1. A process for manufacturing 1,1,1-trichloroethane which comprises photochemically chlorinating ethyl chloride in a gaseous phase at a temperature between 25° C. and 200° C. and in the presence of a gaseous diluent in an amount sufficient to maintain the reaction in the gaseous phase and thereafter recovering the 1,1,1-trichloroethane.

2. A process for manufacturing 1,1,1-trichloroethane which comprises introducing into a reaction zone a gaseous mixture comprising ethyl chloride, chlorine and a gaseous diluent, irradiating said gaseous mixture in the reaction zone with an actinic radiation to cause chlorination of ethyl chloride while maintaining the temperature therein in the range between 25° C. and 200° C., and thereafter recovering the 1,1,1-trichloroethane thus formed.

3. A process according to claim 2 wherein the molar ratio of chlorine to ethyl chloride in the gaseous mixture is between 1 and 6, and the amount of diluent therein is sufficient to maintain the reaction in a gaseous phase.

4. A process according to claim 3 wherein the reaction time is between 1 and 30 seconds.

5. A process according to claim 3 wherein the reaction is carried out under a pressure between an atmospheric pressure and 10 kg./cm.² gauge.

6. A process for manufacturing 1,1,1-trichloroethane which comprises:
  (a) reacting ethylene with hydrogen chloride in the presence of a catalyst to produce ethyl chloride,
  (b) feeding the ethyl chloride thus formed in a gaseous phase together with 1 to 6 moles of chlorine per mole of ethyl chloride and a gaseous diluent in a form of a gaseous mixture to a reaction zone,
  (c) irradiating in the reaction zone the gaseous mixture with an actinic radiation for a period between 1 and 30 seconds while maintaining the temperature in the range from about 25° C. to about 200°

C. thereby synthesizing the 1,1,1-trichloroethane and simultaneously generating hydrogen chloride, (d) removing the gaseous product from the reaction zone, (e) separating the hydrogen chloride from the gaseous product and recycling it for the production of ethyl chloride, and (f) recovering the 1,1,1-trichloroethane.

7. A process according to claim 6 wherein the gaseous diluent is an inert gas.

8. A process according to claim 6 wherein the gaseous diluent is hydrogen chloride and the amount being fed to the reaction is sufficient to maintain the reaction in a gaseous phase.

9. A process according to claim 8 wherein a first portion of the hydrogen chloride generated in the reaction zone is recycled for the formation of ethyl chloride and a second portion is recycled to said reaction zone as the diluent.

10. A continuous process for the manufacture of 1,1,1-trichloroethane which comprises:

(a) reacting ethylene with hydrogen chloride continuously in the presence of a catalyst in a first reaction zone to produce ethyl chloride, (b) passing the ethyl chloride thus formed in a gaseous phase together with 2 to 4 moles of chlorine per mole of ethyl chloride and a gaseous diluent in a form of a gaseous mixture through a second reaction zone. The residence time of the gaseous mixture being 3 to 15 seconds, (c) subjecting the gaseous mixture in the reaction zone to an irradiation of an actinic light to cause photochemical chlorination of the ethyl chloride while maintaining the temperature in a range from 30° C. to 130° C., thereby synthesizing the 1,1,1-trichloroethane with a simultaneous generation of hydrogen chloride, (d) separating the hydrogen chloride from the gaseous mixture exiting from the reaction zone, and recycling at least a portion of the hydrogen chloride thus recovered to said first reaction zone for the production of ethyl chloride, and (e) recovering the 1,1,1-trichloroethane from the exiting gaseous mixture.

11. A process according to claim 10 wherein the gaseous diluent is hydrogen chloride and at least a portion of which is from hydrogen chloride separated from the exiting gaseous mixture.

12. A process according to claim 11 wherein the gas pressures in the first and the second reaction zones are maintained in the range between an atmospheric pressure to 10 kg./cm.$^2$ gauge.

13. A process according to claim 11 wherein the hydrogen chloride is separated from the exiting gaseous mixture by a solvent extraction operation using an organic solvent for chlorine and the chlorinated products, and thereafter the 1,1,1-trichloroethane is recovered from the solvent.

14. A process according to claim 13 wherein the unreacted ethylene chloride and chlorine and chlorinated by-products having lower boiling points than 1,1,1-trichloroethane are removed from the organic solvent and are recycled to the second reaction zone.

15. A process according to claim 11 wherein the hydrogen chloride is recovered from the exiting gaseous mixture by a gas compression operation using a compression pressure sufficient to condense substantially all the gaseous components therein except hydrogen chloride, and thereafter recovering various gaseous components from the condensate by fractionation.

16. A process according to claim 15 wherein the unreacted ethyl chloride and chlorine together with chlorinated by-products having lower boiling points than 1,1,1-trichloroethane recovered from the condensate, are recycled to the second reaction zone.

References Cited
UNITED STATES PATENTS

| | | | |
|---|---|---|---|
| 3,012,081 | 12/1961 | Conrad et al. | 260—658 |
| 3,019,175 | 1/1962 | Haefner et al. | 204—163 |
| 3,345,421 | 10/1967 | Brown | 260—663 |

HOWARD S. WILLIAMS, Primary Examiner